United States Patent
Tsai (10) Patent No.: US 8,336,838 B2
(45) Date of Patent: Dec. 25, 2012

(54) MOUNTING DEVICE AND ELECTRONIC SYSTEM

(75) Inventor: Ho-Yuan Tsai, Taipei (TW)

(73) Assignee: Pegatron Corporation, Taipei (TW)

( * ) Notice: Subject to any disclaimer, the term of this patent is extended or adjusted under 35 U.S.C. 154(b) by 194 days.

(21) Appl. No.: 12/579,852

(22) Filed: Oct. 15, 2009

(65) Prior Publication Data

US 2010/0096522 A1  Apr. 22, 2010

(30) Foreign Application Priority Data

Oct. 16, 2008 (TW) ................................ 97139736 A (51) Int. Cl.
- A47B 96/00 (2006.01)
- A47K 1/00 (2006.01)
- A47K 5/00 (2006.01)
- E04G 5/06 (2006.01)
- F16L 3/08 (2006.01)
- F21V 21/00 (2006.01)
- F21V 35/00 (2006.01)

(52) U.S. Cl. ......... 248/222.51; 248/220.21; 248/222.13; 248/222.52; 312/223.2; 312/332.1; 361/679.31; 361/679.33

(58) Field of Classification Search ............. 361/679.31, 361/679.33, 679.37, 679.39; 248/220.21, 248/220.22, 222.11, 222.13, 222.51, 222.52; 312/223.2, 332.1, 218, 216
See application file for complete search history.

(56) References Cited

U.S. PATENT DOCUMENTS

| | | | | |
|---|---|---|---|---|
| 5,823,644 A | * | 10/1998 | Suh et al. | 312/223.2 |
| 5,825,615 A | * | 10/1998 | Ohara | 361/679.6 |
| 6,377,447 B1 | * | 4/2002 | Boe | 361/679.33 |
| 6,396,686 B1 | * | 5/2002 | Liu et al. | 361/679.33 |
| 6,515,855 B1 | | 2/2003 | Removedummy | |
| 6,836,406 B2 | * | 12/2004 | Weng et al. | 361/679.38 |
| 6,999,308 B2 | * | 2/2006 | Hsu | 361/679.33 |
| 7,256,989 B2 | | 8/2007 | Liu et al. | |
| 7,327,565 B2 | * | 2/2008 | Chen et al. | 361/679.33 |
| 7,549,552 B2 | * | 6/2009 | Hasegawa et al. | 220/323 |
| 7,656,654 B2 | * | 2/2010 | Liu et al. | 361/679.33 |
| 7,755,886 B2 | * | 7/2010 | Peng et al. | 361/679.33 |
| 7,796,380 B2 | * | 9/2010 | Lee | 361/679.33 |
| 7,911,777 B2 | * | 3/2011 | Fan et al. | 361/679.36 |
| 7,950,752 B2 | * | 5/2011 | Lin | 312/333 |
| 2003/0169565 A1 | * | 9/2003 | Wang | 361/685 |
| 2005/0230398 A1 | | 10/2005 | Hasegawa et al. | |
| 2005/0280982 A1 | * | 12/2005 | Yang | 361/684 |
| 2006/0193111 A1 | * | 8/2006 | Han | 361/683 |
| 2006/0273052 A1 | * | 12/2006 | Chen | 211/26 |
| 2007/0053150 A1 | * | 3/2007 | Lee et al. | 361/685 |
| 2007/0121285 A1 | * | 5/2007 | Liang et al. | 361/685 |

* cited by examiner

Primary Examiner — Terrell McKinnon
Assistant Examiner — Michael McDuffie
(74) Attorney, Agent, or Firm — Morris, Manning & Martin, LLP; Tim Tingkang Xia, Esq.

(57) ABSTRACT

This invention provides a mounting device and an electronic system. The electronic system includes an electronic device and a mounting device. The mounting device includes a mounting bracket, a rail member, and a sliding member. The mounting bracket is mounted to the electronic device. The rail member is rotatably and pivotally connected to the mounting bracket. The rail member has a rail, and the rail has a first end and a second end. The sliding member is slidably disposed at the mounting bracket and has a protrusion portion capable of sliding along the rail. When the rail member rotates relative to the mounting bracket and the rail pushes the protrusion portion to move from the first end to the second end, the sliding member is inserted into a fastening hole of the electronic system.

15 Claims, 8 Drawing Sheets

MOUNTING DEVICE AND ELECTRONIC SYSTEM

CROSS-REFERENCE TO RELATED APPLICATIONS

This Non-provisional application claims priority under 35 U.S.C. §119(a) on Patent Application No(s). 097139736 filed in Taiwan, Republic of China on Oct. 16, 2008, the entire contents of which are hereby incorporated by reference.

BACKGROUND OF THE INVENTION

1. Field of the Invention

The invention relates to a mounting device and, more particularly, to a mounting device for mounting an electronic device to an electronic system.

2. Description of the Prior Art

Undoubtedly, a computer has become one necessary object in modern people's life and work. Whatever the computer is, such as a server, a workstation, a desktop computer, a portable computer, or even an industrial computer, the computer has gradually become a necessary and important tool in ordinary people's life and work.

An electronic system usually has a plurality of electronic devices. For example, in a computer system, a hard disk, a floppy disk, a CD-ROM drive, and other storage devices are necessary elements. This kind of the electronic devices needs to be assembled in a casing of the computer system via a mounting device. As far as a popular computer system on the present market is considered, the electronic devices in the computer system are mostly mounted to a casing in a screwed mode.

In a common screwed mode, mounting holes are first disposed at an electronic device, and screw holes corresponding to the mounting holes are disposed at a casing. Screws first pass through the mounting holes of the electronic device, and then the screws are screwed to the corresponding screw holes at the casing, respectively, via a screwdriver by a user. Thus, the electronic device can be screwed to the casing via the screws. A storage device assembled in a conventional storage device base is taken for example hereinbelow.

Figure 1A:
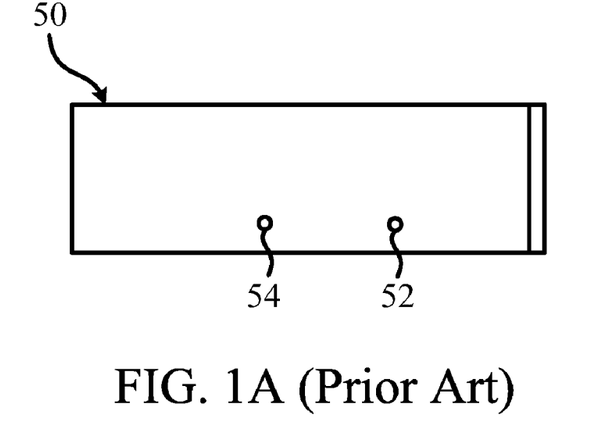
FIG. 1A is a side view showing a storage device.
Figure 1B:
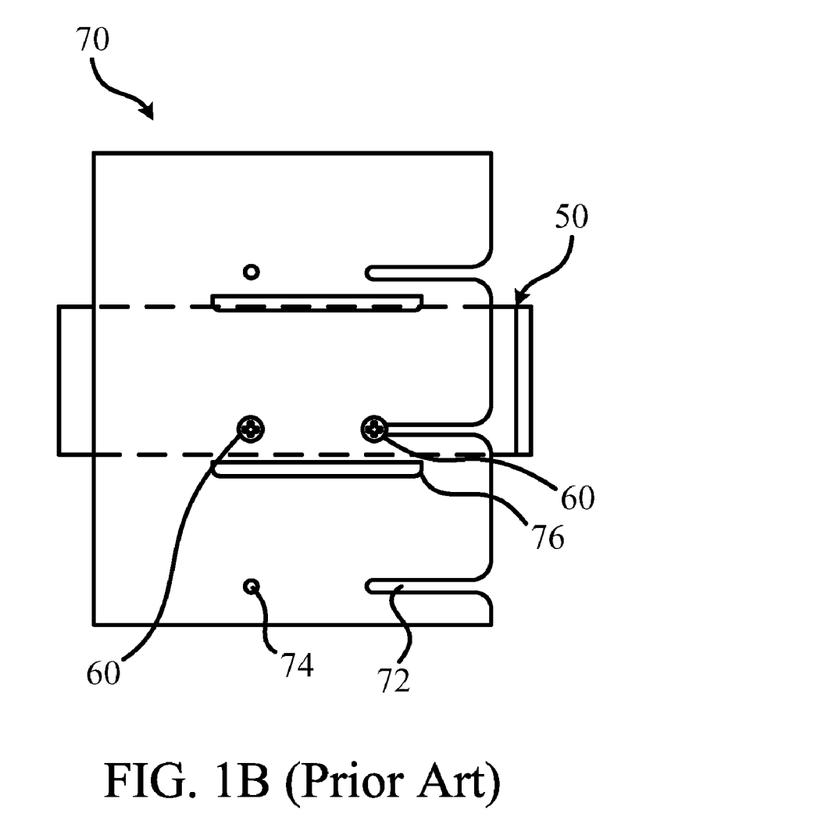
FIG. 1B is a side view showing assembling a conventional storage device base and a storage device.

FIG. 1A is a side view showing a storage device. FIG. 1B is a side view showing assembling a conventional storage device base and a storage device. In FIG. 1A and FIG. 1B, a side wall of a storage device base 70 has a plurality of strip-shaped openings 72 extending from a front edge of the side wall to an inner side and a plurality of mounting holes 74. A side wall of a storage device 50 also has first screw holes 52 corresponding to the strip-shaped openings 72 and second screw holes 54 corresponding to the mounting holes 74. The storage device 50 can be assembled in the storage device base 70 via a rail 76 of the side wall of the storage device base 70. At the same time, a screw 60 disposed in the first screw hole 52 may reach an end of the strip-shaped opening 72. Afterwards, another screw 60 passes through the mounting hole 74 to be screwed to the second screw hole 54, thus to limit the movement of the storage device 50 in a horizontal direction.

According to the above method, although the storage device 50 can be firmly assembled in the storage device base 70, the method still has the following shortcomings. The storage device 50 can limit the movement of the storage device 50 in the horizontal direction only when another screw 60 passes through the mounting hole 74 to be screwed to the second screw hole 54. Therefore, during manufacture, the storage device 50 may fail to be accurately assembled in a predetermined position caused by a size error of the mounting hole 74.

To solve the above problem, generally a closed slot is disposed at the side wall of the storage device base 70. The length of the slot is similar to the distance between the screw holes at the side wall of the storage device. Thus, the screws assembled in the two ends of the side wall of the storage device are against two ends of the slot, respectively, thereby limiting the movement of the storage device in the horizontal direction. However, this method still has shortcomings. According to the storage device having different sizes, the slots having different sizes need to be disposed, and different storage device bases also need to be disposed, which increases the manufacturing and assembling difficulty and fails to satisfy different needs of customers.

In addition, when a user is to assemble or disassemble an electronic device according to the above screwed method, he or she needs to use a tool to screw in or out the screws to assemble or disassemble the electronic device. If there is no corresponding tool on hand, the electronic device fails to be assembled or disassembled, which is inconvenient. On the other hand, since a plurality of screws need to be screwed, the assembling and disassembling process of the electronic device is long, complicated, time-consuming, and laborious. To solve the problem that a tool is needed to assemble or disassemble the screws, on the market, the screws are improved to be thumb screws which can be rotated directly by fingers, so as to solve the problem that the electronic device fails to be disassembled without the tool. However, the user still needs to rotate the thumb screws to fasten the thumb screws, and the method is still time-consuming and laborious. In addition, the cost of the thumb screw is higher than that of the common screw.

SUMMARY OF THE INVENTION

According to one objective of this invention, a mounting device is provided. The mounting device mounts the electronic device to an electronic system with a fastening hole.

In one embodiment of the invention, a mounting device mainly includes a mounting bracket, a rail member, and a sliding member. The mounting bracket has a pivot defined thereon. The mounting bracket is mounted to the electronic device. The rail member is pivotally connected to the pivot. The rail member has a rail, and the rail has a first end and a second end. The distance between the first end and the pivot is smaller than the distance between the second end and the pivot. In addition, the sliding member is slidably disposed at the mounting bracket, and the sliding member has a protrusion portion capable of sliding along the rail. Thereby, when the protrusion portion is located at the first end, the rail member rotates relative to the pivot, and the rail pushes the protrusion portion to move from the first end to the second end, driving the sliding member to slide away from the pivot and to protrude from the mounting bracket thus to allow the sliding member to be fastened to the fastening hole.

According to another objective of the invention, an electronic system is provided. The electronic system has a fastening hole.

In one embodiment of the invention, an electronic system mainly includes an electronic device and a mounting device. The mounting device includes a mounting bracket, a rail member, and a sliding member. The mounting bracket has a pivot defined thereon. The mounting bracket is mounted to the electronic device. The rail member is pivotally connected to the pivot. The rail member has a rail, and the rail has a first end and a second end. Particularly, the distance between the first end and the pivot is smaller than the distance between the second end and the pivot. In addition, the sliding member is slidably disposed at the mounting bracket, and the sliding member has a protrusion portion capable of sliding along the rail. Thereby, when the protrusion portion is located at the first end, the rail member rotates relative to the pivot, and the rail pushes the protrusion portion to move from the first end to the second end, driving the sliding member to slide away from the pivot and to protrude from the mounting bracket thus to allow the sliding member to be fastened to the fastening hole.

Therefore, according to the electronic system and the mounting device in one embodiment of the invention, the rail with a geometrical shape is specially designed at the rail member to correspond to the pivot defined at the mounting bracket. When the rail of the rail member rotates relative to the mounting bracket further to push the protrusion portion of the sliding member to move from the first end to the second end of the rail, the sliding member can leave away from the pivot and be inserted into the fastening hole of the electronic system. Thereby, according to the mounting device in the invention, the electronic device can be mounted to the electronic system free from the screwed method.

These and other features, aspects, and advantages of the present invention will become better understood with regard to the following description, appended claims, and accompanying drawings.

DETAILED DESCRIPTION OF THE INVENTION

One objective of this invention is to provide an electronic system and a mounting device. According to the mounting device, when a rail member rotates relative to a mounting bracket further to allow a rail to push a protrusion portion of a sliding member to move from a first end of the rail to a second end, the sliding member leaves away from a pivot and be inserted into a fastening hole of the electronic system. Preferred embodiments are described in detail hereinbelow.

Figure 2A:
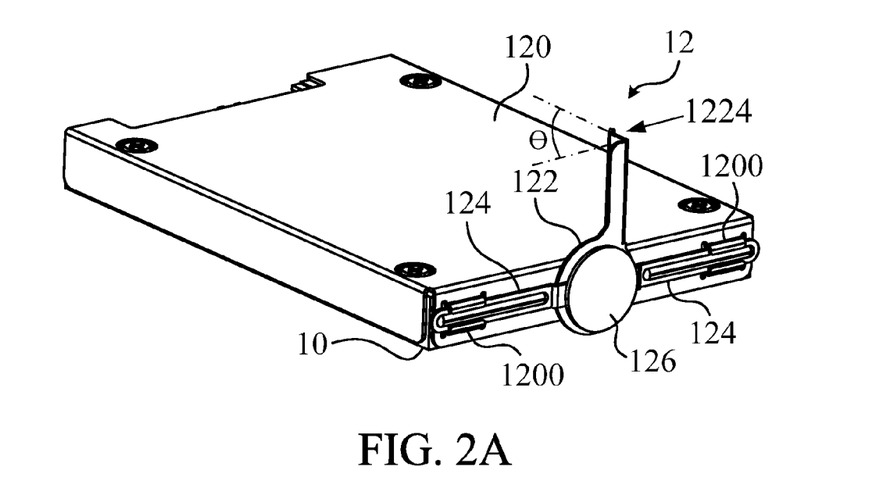
FIG. 2A is a three-dimensional assembled diagram showing a mounting device with an electronic device in a first operation state according to one preferred embodiment of the invention.
Figure 2B:
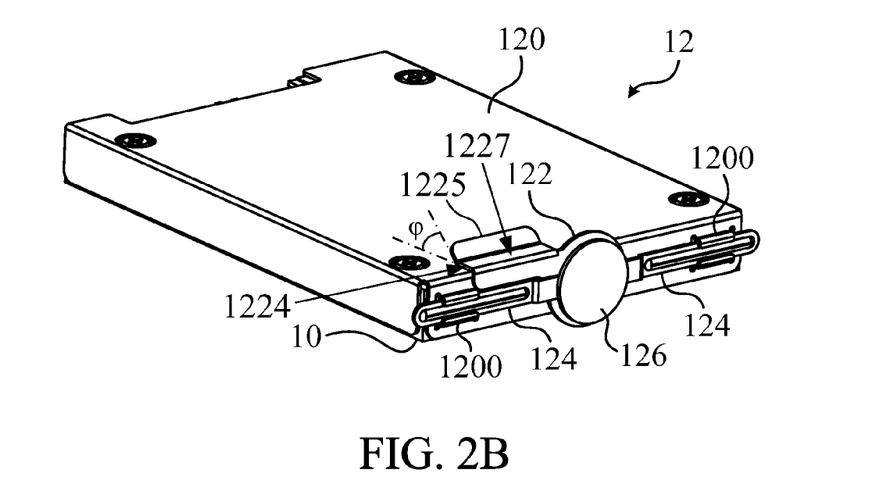
FIG. 2B is a three-dimensional assembled diagram showing the mounting device with the electronic device in FIG. 2A in a second operation state.

FIG. 2A is a three-dimensional assembled diagram showing a mounting device 12 with an electronic device 10 in a first operation state according to one preferred embodiment of the invention. FIG. 2B is a three-dimensional assembled diagram showing the mounting device 12 with the electronic device 10 in FIG. 2A in a second operation state. Please refer to FIG. 2A and FIG. 2B. The main objective of the mounting device 12 in this embodiment of the invention is that the electronic device 10 is mounted to an electronic system (not shown in FIG. 2A and FIG. 2B) free from the screwed method. In other words, in the first operation state, the mounting device 12 is opened. At that moment, the mounting device 12 with the electronic device 10 can be freely disposed at or taken away from the electronic system. In the second operation state, the mounting device 12 is closed. At that moment, if the mounting device 12 with the electronic device 10 is disposed at the electronic system, the electronic device 10 can be fastened.

In FIG. 2A and FIG. 2B, according to this embodiment of the invention, the mounting device 12 mainly includes a mounting bracket 120, a rail member 122, and sliding members 124. The internal structure, function, and operation mode of the mounting device 12 in this embodiment of the invention are described in detail hereinbelow.

Figure 3:
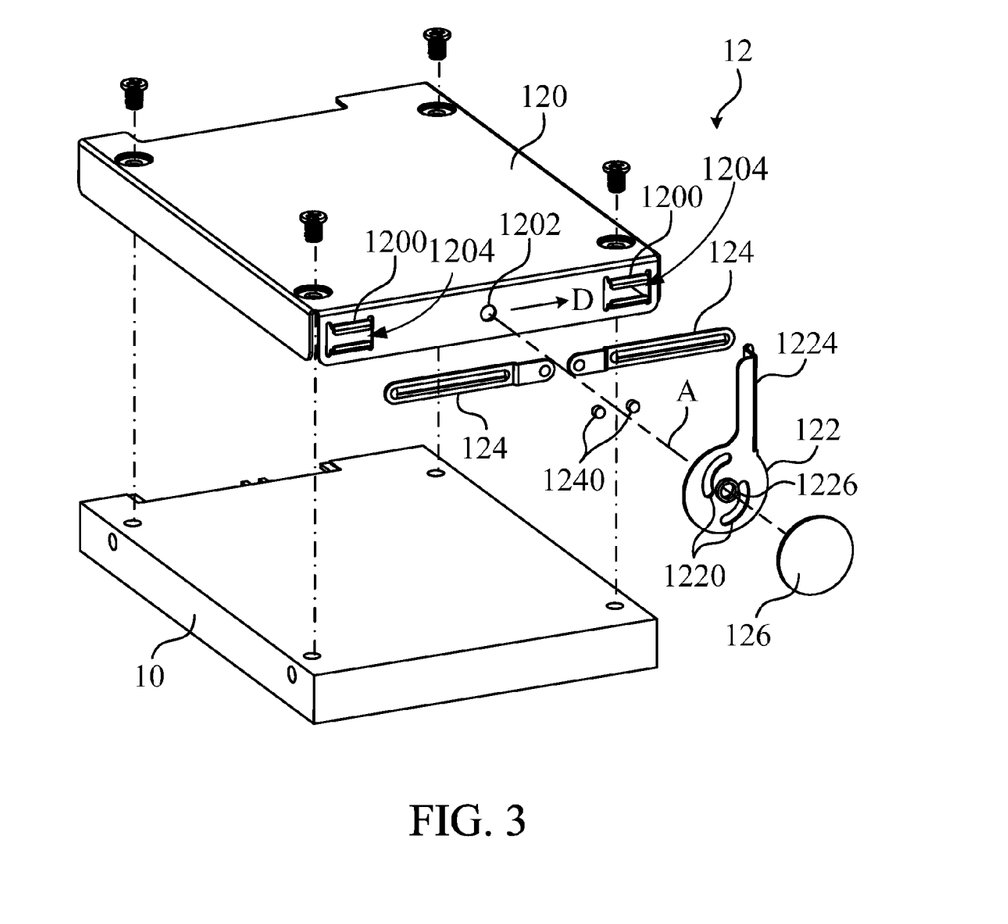
FIG. 3 is a three-dimensional exploded diagram showing the mounting device with the electronic device in FIG. 2A.

FIG. 3 is a three-dimensional exploded diagram showing the mounting device 12 with the electronic device 10 in FIG. 2A. In FIG. 3, the mounting bracket 120 has a pivot A defined thereon. The mounting bracket 120 is mounted to the electronic device 10. The rail member 122 is rotatably and pivotally connected to the pivot A defined at the mounting bracket 120. The rail member 122 has rails 1220. In addition, the sliding member 124 is slidably disposed at the mounting bracket 120, and the sliding member 124 has a protrusion portion 1240 capable of sliding along the rail 1220 of the rail member 122. In a practical application, the protrusion portion 1240 can be detachably assembled with the sliding member 124 as shown in FIG. 3.

Please refer to FIG. 3 in cooperation with FIG. 2A and FIG. 2B. According to this embodiment of the invention, the mounting bracket 120 of the mounting device 12 further includes a limiting portion 1200 for limiting the sliding member 124 to slide along a direction D relative to the mounting bracket 120. In this preferred embodiment, the limiting portion 1200 is disposed at the mounting bracket 120 along the direction D vertical to the pivot A, defining a guiding groove 1204 between the limiting portion 1200 and the mounting bracket 120. Therefore, when the protrusion portion 1240 of the sliding member 124 is located at one end of the rail member 122, the rail member 122 rotates relative to the pivot A, and the rail 1220 pushes the protrusion portion 1240 to move from one end to the other end, driving the sliding member 124 to slide away from the pivot A in the guiding groove 1204 and to protrude from the mounting bracket 120.

In FIG. 3, the rail member 122 of the mounting device 12 further includes a pulling portion 1224. Since the pulling portion 1224 designed at the rail member 122 is easy for exerting a force, when the mounting device 12 is operated, the rail member 122 can be easily rotated around the pivot A relative to the mounting bracket 120. In other words, the pulling portion 1224 formed at the rail member 122 can easily switch the mounting device 12 between the first operation state and the second operation state.

In addition, in FIG. 3, the mounting device 12 may be mounted to the electronic device 10 in a screwed mode. However, the invention is not limited thereto. For example, the mounting device 12 can be mounted to the electronic device 10 in a pluggable or engaged mode or by a mobile assembling mounting device. The electronic device 10 may be a hard disk, a floppy disk, a CD-ROM drive, or other storage devices. However, the invention is not limited thereto.

As shown in FIG. 2B, the pulling portion 1224 includes a tilting segment 1225 and a laminating segment 1227. The tilting segment 1225 is the tilting end portion of the pulling portion 1224, and the laminating segment 1227 is the flat portion connecting the tilting segment 1225 and the rail member 122. In other words, the laminating segment 1227 is coupled to the rail member 122, and the tilting segment 1225 extends from the laminating segment 1227, and when the pulling portion 1224 contacts the mounting bracket 120, the laminating segment 1227 laminates on a surface of the mounting bracket 120 and an included angle $\phi$ is formed between the tilting segment 1225 and a laminated surface of the mounting bracket 120. Further, as shown in FIG. 2A, an included angle $\theta$ is formed between the pulling portion 1224 and the rail member 122.

Figure 4:
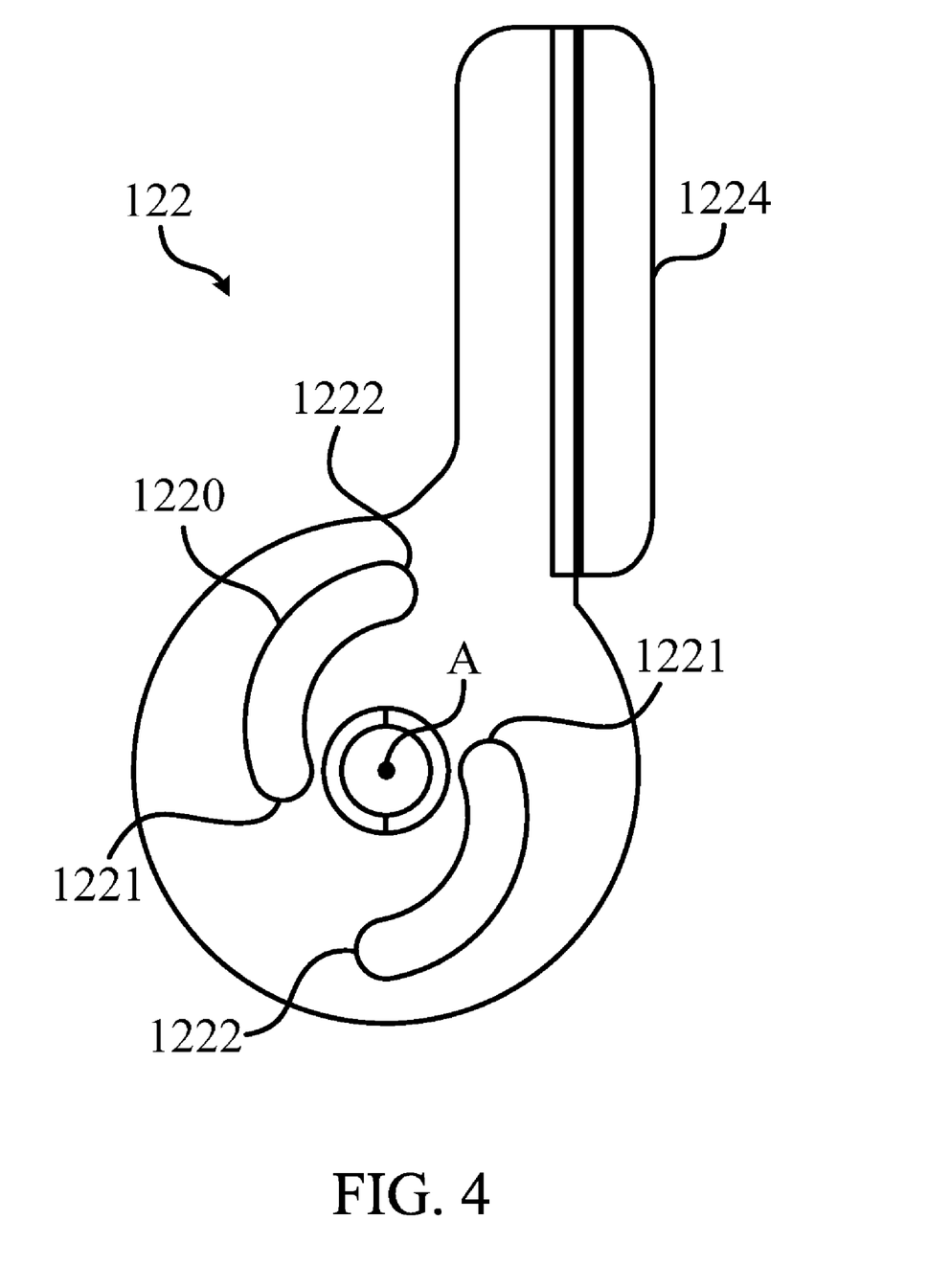
FIG. 4 is a front view showing a rail member in FIG. 3.

FIG. 4 is a front view showing the rail member 122 in FIG. 3. Please refer to FIG. 3 and FIG. 4 together. In FIG. 4, the rail 1220 of the rail member 122 has a first end 1221 and a second end 1222. Particularly, the distance between the first end 1221 of the rail 1220 and the pivot A defined at the mounting bracket 120 is smaller than the distance between the second end 1222 and the pivot A. According to the above design of the rail member 122 of the mounting device 12, when the rail member 122 rotates relative to the mounting bracket 120 further to allow the rail 1220 of the rail member 122 to push the protrusion portion 1240 of the sliding member 124 to move from the first end 1221 of the rail 1220 to the second end 1222, the sliding member 124 can leave away from the pivot A along the direction D or the opposite direction.

Figure 5A:
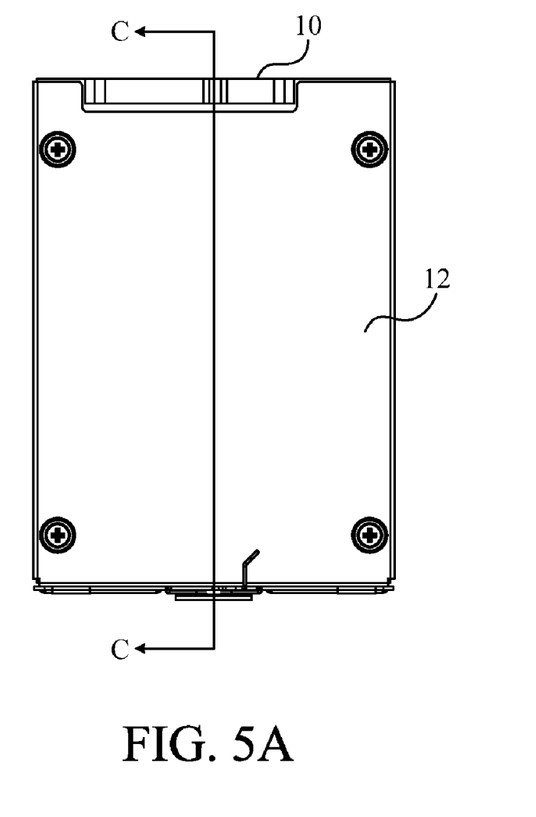
FIG. 5A is a top view showing the mounting device with the electronic device in FIG. 2A.
Figure 5B:
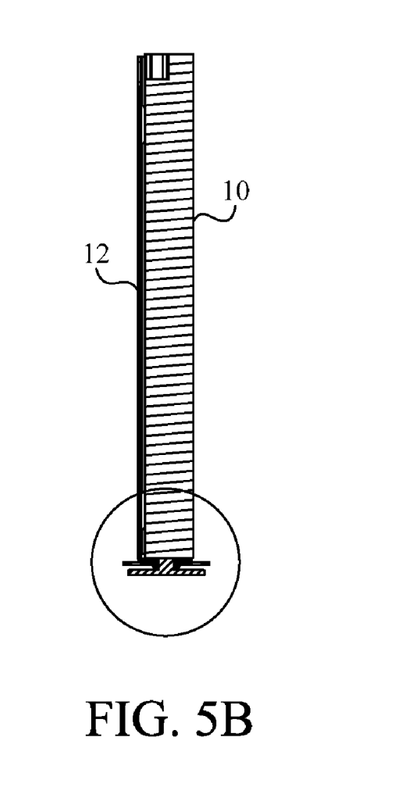
FIG. 5B is a sectional schematic diagram showing the mounting device with the electronic device along a sectional line C-C in FIG. 5A.
Figure 5C:
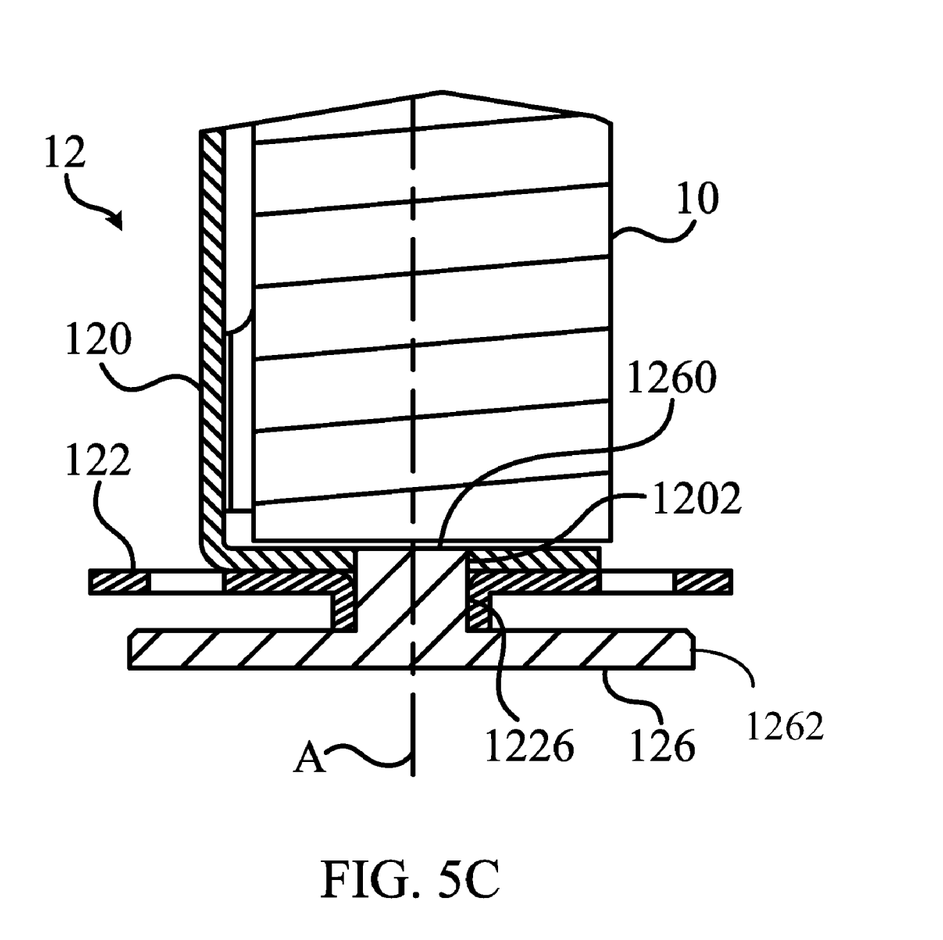
FIG. 5C is a partial enlarged schematic diagram showing the marked portion in FIG. 5B.

FIG. 5A is a top view showing the mounting device 12 with the electronic device 10 in FIG. 2A. FIG. 5B is a sectional schematic diagram showing the mounting device 12 with the electronic device 10 along a sectional line C-C in FIG. 5A. FIG. 5C is a partial enlarged schematic diagram showing the marked portion in FIG. 5B. Please refer to FIG. 5A, FIG. 5B, and FIG. 5C.

Please refer to FIG. 5C in cooperation with FIG. 3. According to this embodiment of the invention, the mounting device 12 can further include a fastening member 126. The fastening member 126 can be disposed at the mounting bracket 120 along the pivot A defined at the mounting bracket 120. In detail, the fastening member 126 can have a column 1260 and a stop plate 1262, and one end of the column 1260 is fixed on a surface of the stop plate 1262. The mounting bracket 120 can have a mounting hole 1202 formed along the pivot A. Further, the rail member 122 has a through hole 1226. Thereby, another end of the column 1260 of the fastening member 126 can pass through the through hole 1226 of the rail member 122 to be inserted into the mounting hole 1202 of the mounting bracket 120, thus to prevent the rail member 122 from being separated from the mounting bracket 120.

In a practical application, the fastening member 126 may have a mounting hole 1202. Correspondingly, the mounting bracket 120 may have a column 1260 formed along the pivot A. Further, the rail member 122 may have a through hole 1226. Thereby, the column 1260 of the mounting bracket 120 which passes through the through hole 1226 of the rail member 122 to be exposed can be inserted into the mounting hole 1202 of the fastening member 126, further to prevent the rail member 122 from being separated from the mounting bracket 120. In other words, via the cooperation of the fastening member 126, the mounting bracket 120, and the rail member 122, the mounting device 12 can be switched between the first operation state and the second operation state, thus to effectively prevent human factors such as casual collision from separating the rail member 122 from the mounting bracket 120.

Figure 6A:
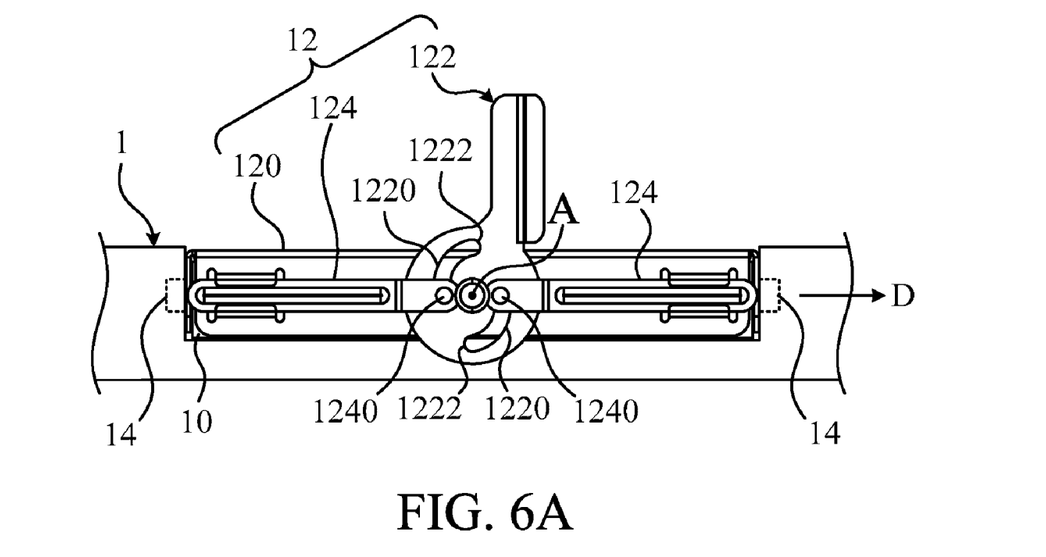
FIG. 6A is a front view showing an electronic system according to one preferred embodiment of the invention, where a mounting device is in a first operation state.
Figure 6B:
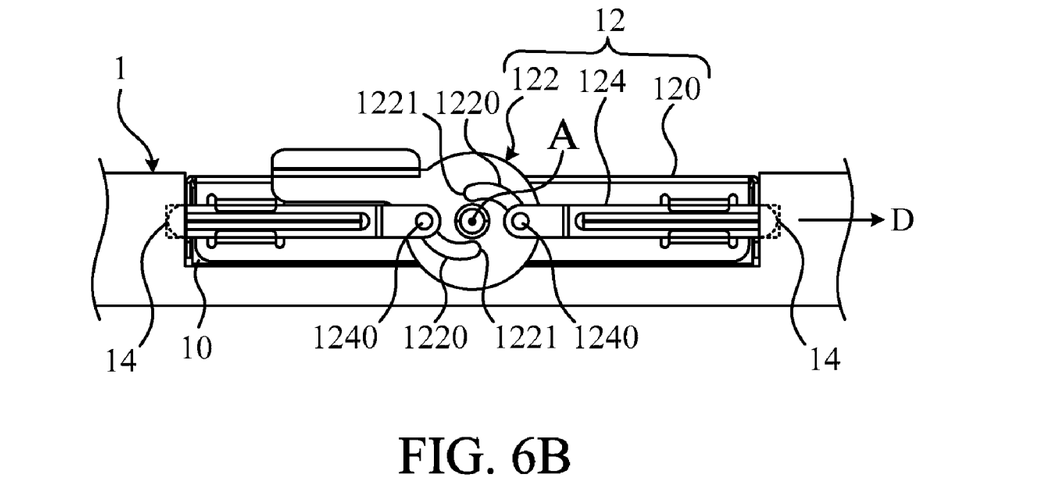
FIG. 6B is a front view showing the electronic system in FIG. 6A, where the mounting device is in a second operation state.

Please refer to FIG. 6A and FIG. 6B in cooperation with FIG. 3. FIG. 6A is a front view showing an electronic system 1 according to one preferred embodiment of the invention. In FIG. 6A, the mounting device 12 is in a first operation state. FIG. 6B is a front view showing the electronic system 1 in FIG. 6A. In FIG. 6B, the mounting device 12 is in a second operation state. In FIG. 6A and FIG. 6B, two sides of the electronic system 1 have fastening holes 14. The electronic system 1 in this embodiment of the invention includes the electronic device 10 and the mounting device 12 as shown in FIG. 3. The mounting device 12 can be used for mounting the electronic device 10. The mounting device 12 includes a mounting bracket 120, a rail member 122, and a sliding member 124. The structures, functions, and operation modes of the mounting bracket 120, the rail member 122, and the sliding member 124 are not described for a concise purpose.

When the protrusion portion 1240 of the sliding member 124 is located at the first end 1221, the rail member 122 rotates relative to the pivot A, and the rail 1220 pushes the protrusion portion 1240 to move from the first end 1221 to the second end 1222, driving the sliding member 124 to slide away from the pivot A in the guiding groove 1204 and to protrude from the mounting bracket 120 thus to allow the sliding member 124 to be fastened to the fastening hole 14 (that is, the mounting device 12 is switched from the first operation state to the second operation state). Further, via the limiting portion 1200 disposed at the mounting bracket 120, the sliding member 124 can be limited to slide in the guiding groove 1204 along the direction D or the opposite direction relative to the mounting bracket 120. Therefore, as the sliding members 124 which are pushed to move outward and the fastening holes 14 of the electronic system 1 are fastened to each other, two sides of the mounting device 12 with the electronic device 10 can be firmly fastened to the electronic system 1.

In the above embodiment regarding the mounting device 12, the bilateral symmetrical design is taken for example (that is, the rail member 122 has two rails 1220, and there are two sliding members 124, such that when the rail member 122 rotates, the two sliding members 124 can leave away from the pivot A along the direction D and the opposite direction, respectively). However, the invention is not limited thereto.

Figure 7A:
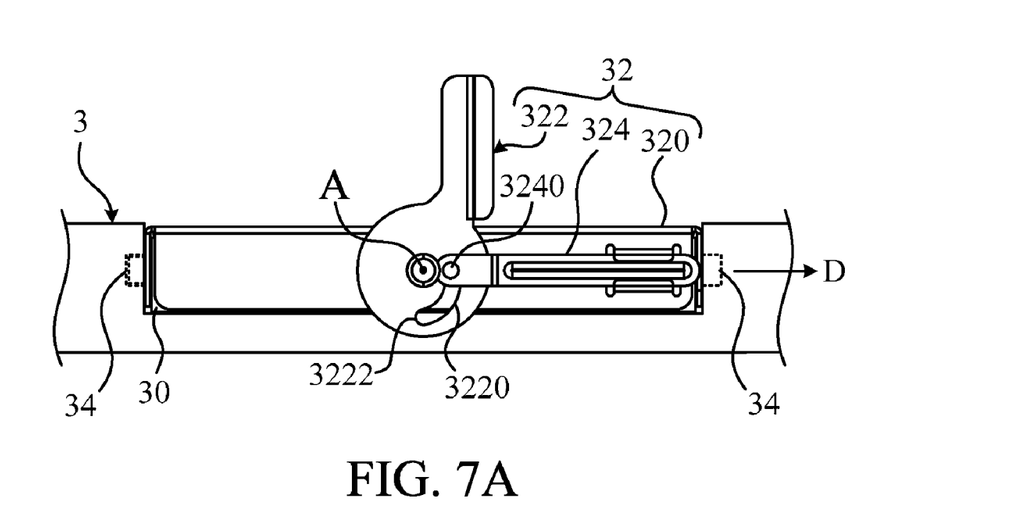
FIG. 7A is a front view showing an electronic system according to another preferred embodiment of the invention, where a mounting device is in a first operation state.
Figure 7B:
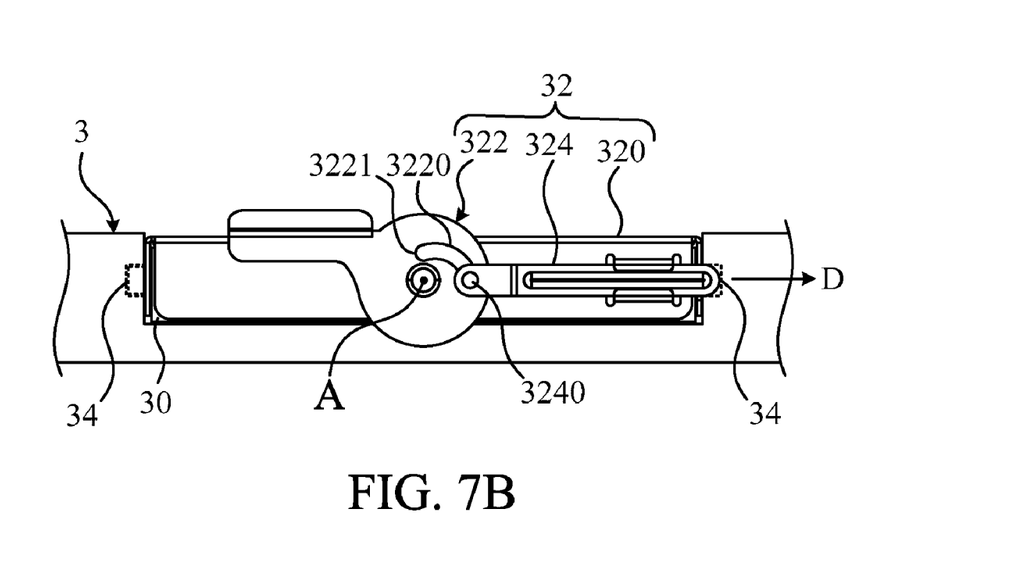
FIG. 7B is a front view showing the electronic system in FIG. 7A, where the mounting device is in a second operation state.

Please refer to FIG. 7A and FIG. 7B. FIG. 7A is a front view showing an electronic system 3 according to another preferred embodiment of the invention. In FIG. 7A, a mounting device 32 is in a first operation state. FIG. 7B is a front view showing the electronic system 3 in FIG. 7A. In FIG. 7B, the mounting device 32 is in a second operation state. In FIG. 7A, two sides of the electronic system 3 also have fastening holes 34. The electronic system 3 includes an electronic device 30 and the mounting device 32. The mounting device 32 includes a mounting bracket 320, a rail member 322, and a sliding member 324. The structures, functions, and operation modes of the mounting bracket 320, the rail member 322, and the sliding member 324 can refer to the above description and related drawings. Therefore, they are not described for a concise purpose hereinbelow. The difference between this embodiment and the above embodiment is that in this embodiment the rail member 322 of the mounting device 32 only has a rail 3220, and there is also only one corresponding sliding member 324 as shown in FIG. 7A and FIG. 7B.

In a practical application, when the mounting device 32 with the electronic device 30 is mounted to the electronic system 3, one side edge of the mounting device 32 may further include a fastening portion (not shown) corresponding to the fastening hole 34 of the electronic system 3. In other words, the fastening portion of the mounting device 32 may be inserted into the fastening hole 34 of the electronic system 3, thus to fasten one side of the mounting device 32 first. Then, the rail member 322 of the mounting device 32 may be rotated relative to the mounting bracket 320, further to allow the rail 3220 of the rail member 322 to push the protrusion portion 3240 of the sliding member 324 to move from the first end 3221 to the second end 3222 of the rail 3220. Thereby, the sliding member 324 may be driven to move and to be inserted into the fastening hole 34 of the electronic system 3. Thus, both of the two sides of the mounting device 32 may be fastened to the electronic device 30.

According to the electronic device and the mounting device in the preferred embodiments of the invention, the rail with a geometrical shape is specially designed at the rail member to correspond to the pivot defined at the mounting bracket. When the rail of the rail member rotates relative to the mounting bracket further to push the protrusion portion of the sliding member to move from the first end to the second end of the rail, the sliding member can leave away from the pivot and be inserted into the fastening hole of the electronic system. Thereby, according to the mounting device in the invention, the electronic device can be mounted to the electronic system free from the screwed method.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A mounting device for mounting an electronic device to an electronic system, the electronic system having a fastening hole, the mounting device comprising:
   a mounting bracket having a pivot defined thereon and having a mounting hole formed along the pivot, the mounting bracket being mounted to the electronic device;
   a rail member pivotally connected to the pivot, the rail member having a through hole and a rail, the rail having a first end and a second end, the distance between the first end and the pivot being smaller than the distance between the second end and the pivot;
   a sliding member slidably disposed at the mounting bracket, the sliding member having a protrusion portion capable of sliding along the rail;
   a fastening member disposed at the mounting bracket along the pivot, the fastening member having:
      a stop plate; and
      a column for passing through the through hole to be inserted into the mounting hole, one end of the column fixed on a surface of the stop plate, and another end of the column engaging with the mounting hole, to prevent the rail member from being separated from the mounting bracket; and
   a pulling portion formed at the rail member, the pulling portion is operated to rotate the rail member;
   wherein when the protrusion portion is located at the first end, the rail member rotates relative to the pivot, and the rail pushes the protrusion portion to move from the first end to the second end while the pulling portion contacts the mounting bracket, the sliding member is driven to slide away from the pivot and to protrude from the mounting bracket thus to allow the sliding member to be fastened to the fastening hole.

2. The mounting device according to claim 1, wherein the mounting device is mounted to the electronic device in a screwed mode.

3. The mounting device according to claim 1, wherein the mounting bracket further comprises a limiting portion for limiting the sliding member to slide along a direction relative to the mounting bracket.

4. An electronic system having a fastening hole, the electronic system comprising:
   an electronic device; and
   a mounting device including:
      a mounting bracket having a pivot defined thereon and having a mounting hole formed along the pivot, the mounting bracket being mounted to the electronic device;
      a rail member pivotally connected to the pivot, the rail member having a through hole and a rail, the rail having a first end and a second end, the distance between the first end and the pivot being smaller than the distance between the second end and the pivot;
      a sliding member slidably disposed at the mounting bracket, the sliding member having a protrusion portion capable of sliding along the rail;
      a fastening member disposed at the mounting bracket along the pivot, the fastening member having:
         a stop plate; and
         a column for passing through the through hole to be inserted into the mounting hole, one end of the column fixed on a surface of the stop plate, and another end of the column engaging with the mounting hole, to prevent the rail member from being separated from the mounting bracket; and
      a pulling portion formed at the rail member, the pulling portion is operated to rotate the rail member;
      wherein when the protrusion portion is located at the first end, the rail member rotates relative to the pivot, and the rail pushes the protrusion portion to move from the first end to the second end while the pulling portion contacts the mounting bracket, the sliding member is driven to slide away from the pivot and to protrude from the mounting bracket thus to allow the sliding member to be fastened to the fastening hole.

5. The electronic system according to claim 4, wherein the mounting device is mounted to the electronic device in a screwed mode.

6. The electronic system according to claim 4, wherein the mounting bracket further comprises a limiting portion for limiting the sliding member to slide along a direction relative to the mounting bracket.

7. The mounting device according to claim 3, further comprising a guiding groove defined between the limiting portion and the mounting bracket, wherein the sliding member is moveable disposed within the guiding groove.

8. The mounting device according to claim 1, wherein the pulling portion and the rail member laminate in different plane.

9. The mounting device according to claim 1, wherein an included angle is formed between the pulling portion and the rail member.

10. The mounting device according to claim 1, wherein the pulling portion has a laminating segment coupled to the rail member and a tilting segment extending from the laminating segment, and when the pulling portion contacts the mounting bracket, the laminating segment laminates on a surface of the mounting bracket and an included angle is formed between the tilting segment and a laminated surface of the mounting bracket.

11. The electronic system according to claim 6, further comprising a guiding groove defined between the limiting portion and the mounting bracket, wherein the sliding member is moveable disposed within the guiding groove.

12. The electronic system according to claim 4, wherein the pulling portion and the rail member laminate in different plane.

13. The electronic system according to claim 4, wherein an included angle is formed between the pulling portion and the rail member.

14. The electronic system according to claim 4, wherein the pulling portion has a laminating segment coupled to the rail member and a tilting segment extending from the laminating segment, and when the pulling portion contacts the mounting bracket, the laminating segment laminates on a surface of the mounting bracket and an included angle is formed between the tilting segment and a laminated surface of the mounting bracket.

15. A mounting device for mounting an electronic device to an electronic system, the electronic system having a fastening hole, the mounting device comprising:
- a mounting bracket having a pivot defined thereon and a column formed along the pivot, the mounting bracket being mounted to the electronic device;
- a rail member pivotally connected to the pivot, the rail member having a through hole and a rail, the rail having a first end and a second end, the distance between the first end and the pivot being smaller than the distance between the second end and the pivot;
- a sliding member slidably disposed at the mounting bracket;
- a protrusion portion fixed in one end of the sliding member near the pivot and movably disposed inside the rail, wherein another end of the sliding member is inserted into the fastening hole when the protrusion portion is located at the second end of the rail; and
- a fastening member disposed at the mounting bracket along the pivot, the fastening member having a mounting hole;
- wherein one end of the column is fixed in the mounting bracket and another end of the column engages with the mounting hole through the through hole.

* * * * *